US012745713B2

(12) United States Patent
Sankhla et al.

(10) Patent No.: US 12,745,713 B2
(45) Date of Patent: Sep. 29, 2026

(54) FAN ASSEMBLY FOR A CLEANING DEVICE OF A COMBINE HARVESTER

(71) Applicant: DEERE & COMPANY, Moline, IL (US)

(72) Inventors: Dhairya Sankhla, Pune (IN); Kiran Kumar Mayya, Pune (IN); Nicholas J. Keener, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 242 days.

(21) Appl. No.: 18/777,929

(22) Filed: Jul. 19, 2024

(65) Prior Publication Data

US 2025/0151657 A1 May 15, 2025

(30) Foreign Application Priority Data

Nov. 9, 2023 (DE) ......................... 102023131104.2

(51) Int. Cl.
*A01F 12/44* (2006.01)
*A01F 12/48* (2006.01)

(52) U.S. Cl.
CPC .......... *A01F 12/444* (2013.01); *A01F 12/446* (2013.01); *A01F 12/48* (2013.01)

(58) Field of Classification Search
CPC ...... A01F 12/444; A01F 12/446; A01F 12/48; A01F 12/44; A01D 41/1276
See application file for complete search history.

(56) References Cited

U.S. PATENT DOCUMENTS 2,987,172 A * 6/1961 Linsenmeyer ........ F04D 29/283 96/139
4,436,484 A * 3/1984 Temple ................. F04D 29/283 416/214 R
4,884,946 A 12/1989 Belanger et al.
2018/0035613 A1* 2/2018 Hui ....................... F04D 29/626
2018/0352739 A1* 12/2018 Puryk ..................... A01F 12/40
2019/0327899 A1* 10/2019 Wold .................... A01F 12/444

FOREIGN PATENT DOCUMENTS

EP 1733610 A1 12/2006
EP 3208466 A1 8/2017
EP 3494775 A1 6/2019

* cited by examiner

*Primary Examiner* — Brad Harcourt

(57) ABSTRACT

A fan assembly for a cleaning device of a combine harvester includes a fan rotor, a housing which accommodates the fan rotor and defines an air inlet opening through which the fan rotor is inserted during assembly, and an inlet ring, which extends radially inward from the air inlet opening of the housing. A retaining ring is fastened to the housing and is equipped with elevations distributed around its circumference. The inlet ring is attached to the retaining ring and is provided with elevations, which are complementary to and abut the elevations of the retaining ring. The retaining ring and the inlet ring are connected to one another at their respective elevations by insertable retaining elements extending through coaxial openings in the elevations.

20 Claims, 4 Drawing Sheets

FAN ASSEMBLY FOR A CLEANING DEVICE OF A COMBINE HARVESTER

CROSS-REFERENCE TO RELATED APPLICATIONS

This application claims the benefit of German Patent Application DE 102023131104.2, filed on Nov. 9, 2023, the disclosure of which is hereby incorporated by reference.

TECHNICAL FIELD

The disclosure generally relates to a fan assembly for a cleaning device of a combine harvester.

BACKGROUND

Combine harvesters are used to harvest grain-type fruits. Plants in a field or their seed heads are received or cut off or separated from the plants by means of a harvesting header and fed to a threshing and separating device in order to separate the fruit (e.g. grain) from the other components of the crop. After the threshing and separating operation, there are still contaminants in the grain, such as straw particles and chaff. The mixture of grain and contaminants obtained during the threshing and separation is therefore fed to a cleaning system, which generally comprises a top screen and a bottom screen and optionally a preliminary screen.

The screens are generally suspended on front and rear hangers and moved by means of an eccentric drive. In this way, the screens are set into an oscillating reciprocating motion, in which they move forward and rearward and upward and downward on elliptical or circular paths. In addition, an air flow is applied to them from below by a fan assembly. The effect thus achieved is that the mixture on the screen is periodically thrown upward (at the upper reversal point of the path) and, after traveling a trajectory parabola, lands back on the screen. By means of the air flow and the impact on the screen after the throwing, the heavier grain is separated from the lighter contaminants.

The fan assembly comprises a housing, in which a fan rotor is arranged for rotation about a horizontal axis extending transversely to the forward direction of the combine harvester. A variable-rotational-speed drive allows the rotational speed of the fan rotor to be adapted to the particular harvesting conditions. The housing comprises axial air inlets on both sides of the fan rotor, said air inlets surrounding the shaft of the fan rotor at a distance, and one or more tangential outlets directed at the screens in order to apply the air flow to the screens. Generally, a plurality of such fan assemblies is distributed over the width of the cleaning system, which fan assemblies can be arranged in common or separate housings (see e.g. EP 1 733 610 A1, EP 3 208 466 A1 or EP 3 494 775 A1).

For reasons of production, cost and weight, it can be sensible to produce the housing from plastic, e.g. in a rotational or injection molding method, as described in EP 3 208 466 A1. However, there is the problem that the fan rotor must be installed through the axial air inlets of the housing and therefore the diameter of the fan rotor cannot be greater than the diameter of the air inlets. In turn, this leads to problems with the air intake. A solution to this is to mount separate inlet rings at the air inlets after the fan rotor has been installed, said inlet rings extending inward from the opening in the housing and overlapping with the envelope circle of the fan rotor, as shown e.g. in U.S. Pat. No. 4,884,946 A.

In the prior art, the inlet rings are fastened by means of screws, which are screwed into screw threads in retainers, which retainers, in turn, are anchored in the material of the housing in a form-fitting manner (U.S. Pat. No. 4,884,946 A) or are pushed, as U-shaped clips, onto recesses in the edge of the housing and are fixed there in a form-fitting and force-fitting manner.

SUMMARY

A fan assembly for a cleaning device of a combine harvester is provided. The fan assembly includes a fan rotor, which can be set into rotation about an axis of rotation by means of a drive. A housing accommodates the fan rotor and includes an air inlet opening, through which the fan rotor can be inserted into the housing. The housing further includes at least one air outlet opening, which is tangential to the fan rotor. An inlet ring extends radially inward from the air inlet opening of the housing. A retaining ring extends radially outward with respect to the air inlet opening and is equipped with elevations distributed around its circumference. The retaining ring is fastened to the housing, such that the inlet ring is attached to the face of the retaining ring spaced apart from the housing and is provided with elevations, which are complementary to the elevations of the retaining ring and abut the elevations of the retaining ring from the outside. The retaining ring and the inlet ring are connected to one another at the elevations by means of insertable retaining elements with the retaining elements extending through coaxial openings in the elevations.

In other words, the retaining ring is attached at the air inlet opening of the housing, to which the retaining ring and the inlet ring are fastened from the outside by the insertion of retaining elements through coaxial openings at in the elevations which fit together in the retaining ring and in the inlet ring. In this way, the time outlay for assembling the fan assembly is reduced.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as “above,” “below,” “upward,” “downward,” “top,” “bottom,” etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
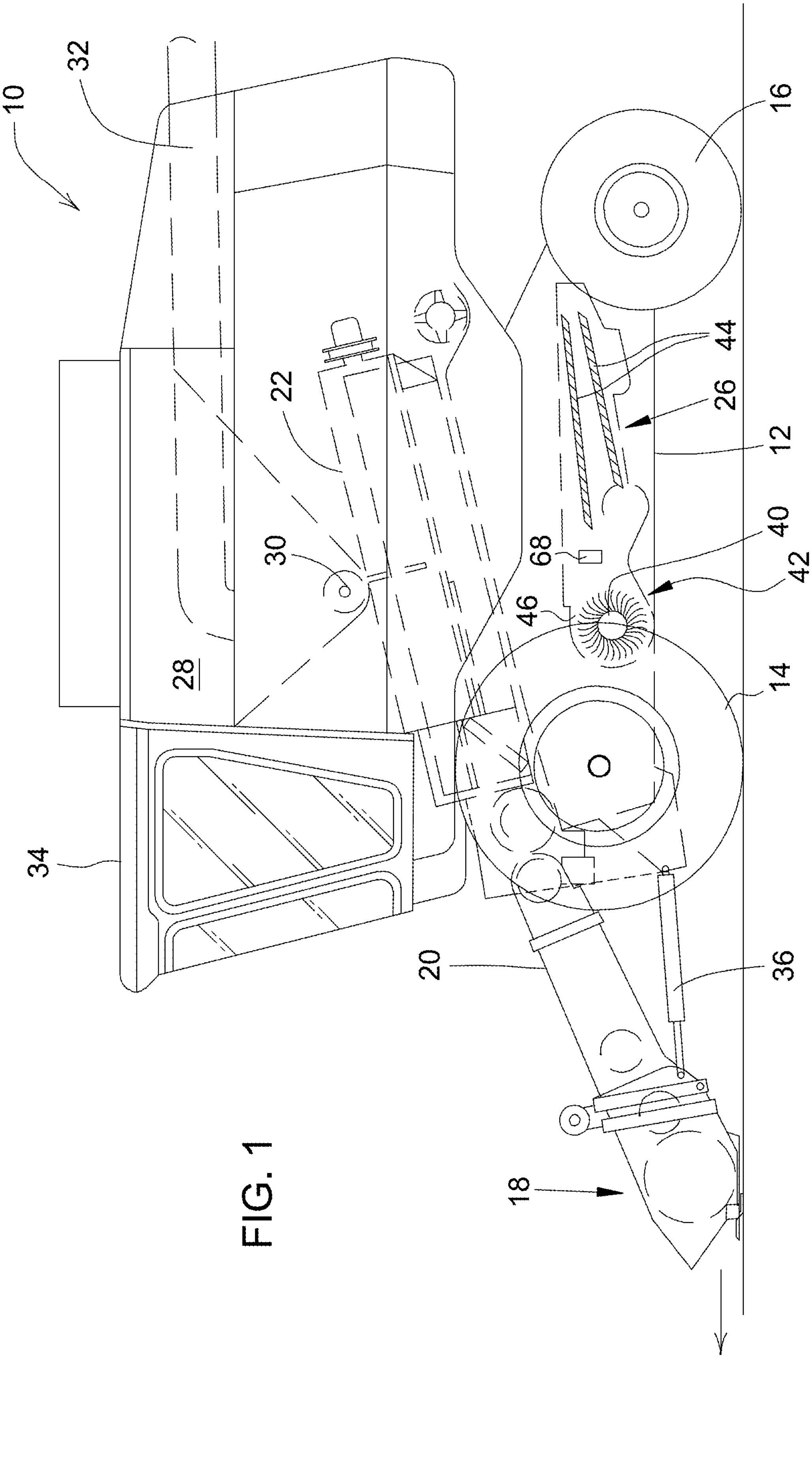
FIG. 1 is a schematic side view of a combine harvester.

FIG. 1 shows a self-propelled harvesting machine in the form of a combine harvester 10 having a chassis 12, which is supported on the ground by means of driven front wheels 14 and steerable rear wheels 16 and is moved by said wheels. The wheels 14, 16 are set into rotation by drive means (not shown) in order to move the combine harvester 10, for example, over a field to be harvested. In the following text, direction indications, such as front and rear, relate to the direction of travel V, running to the left in FIG. 1, of the combine harvester 10 in harvesting operation.

A harvesting header 18 in the form of a cutting unit is removably connected to the front end region of the combine harvester 10 in order to harvest crops in the form of cereal or other threshable stalk crops from the field during harvesting operation and to feed them upward and rearward through a feeder house assembly 20 to an axial threshing unit 22. The mixture passing through threshing concaves and gratings in the axial threshing unit 22 and containing grains and contaminants passes into a cleaning device 26. Cereal cleaned by the cleaning device 26 is supplied by means of a grain screw to a grain elevator, which conveys said cereal into a grain tank 28. The cleaned cereal from the grain tank 28 can be discharged by means of a discharge system having a transverse screw 30 and having a discharge conveyor 32. The above-mentioned systems are driven by means of an internal combustion engine and are monitored and controlled by an operator from a driver's cab 34.

As generally understood by those skilled in the art, the cleaning device 26 includes an upper screen 44 and a lower screen 44, to which an air flow is applied by means of a fan assembly 42 having a fan rotor 40 and having a housing 46 surrounding the fan rotor 40, said air flow flowing through the screens 44 rearward and upward. The size of the screen openings and the rotational speed of the fan rotor 40, which can be set into rotation about its axis extending horizontally and transversely to the forward direction V by means of a variable-rotational-speed drive 68, can be varied in a manner known per se by an automatic cleaning setting means or by the operator from the driver's cab 34.

Figure 2:
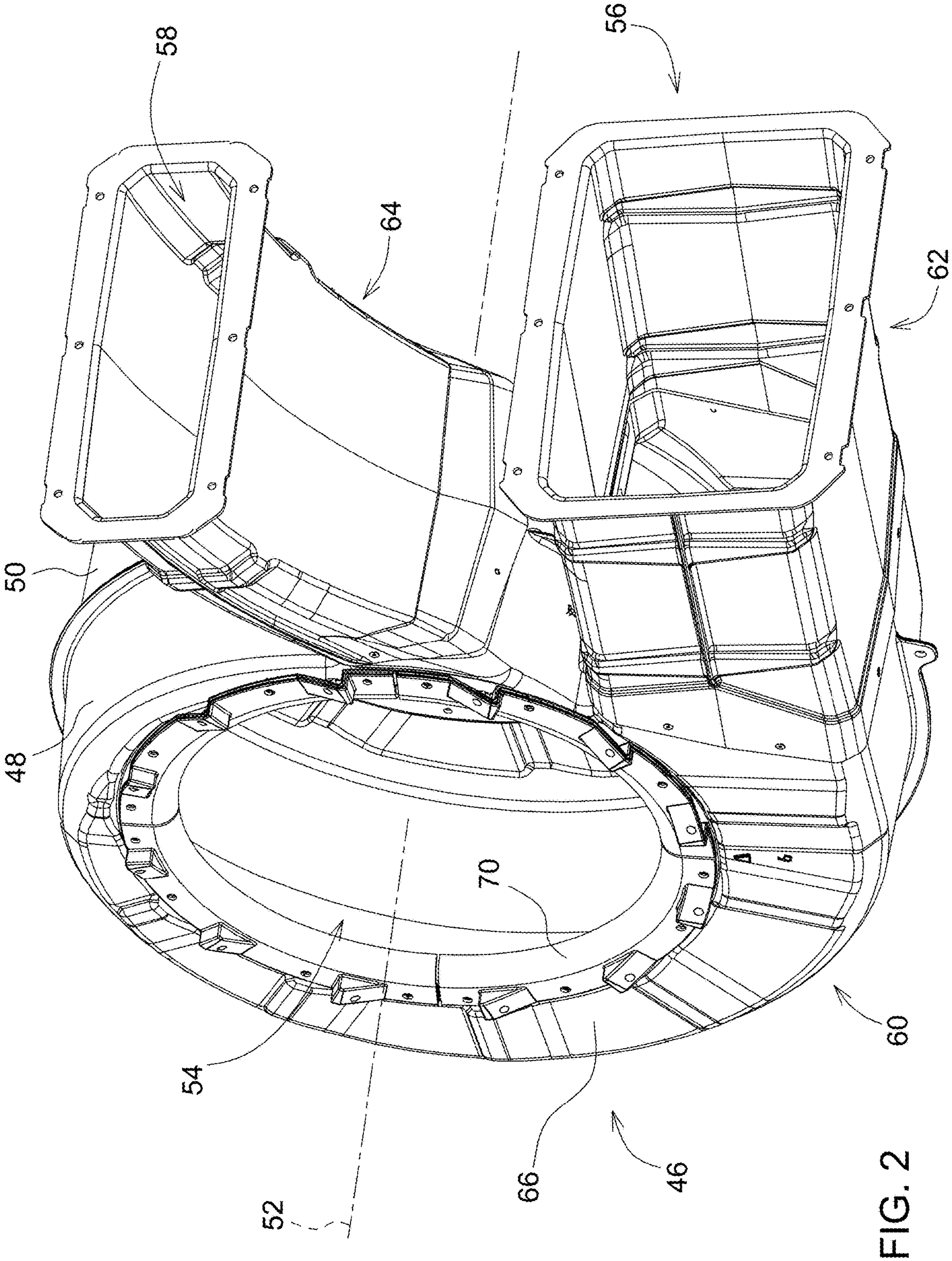
FIG. 2 is a schematic perspective view of a fan assembly of a cleaning device of the combine harvester, showing a first embodiment of the housing.

Reference is now made to FIG. 2, which shows a perspective view of the housing 46. The housing 46 consists of two halves 48, 50, which are produced with mirror symmetry with respect to the longitudinal central plane of the housing 46, in particular in an injection molding or rotational molding process (cf. EP 3 208 466 A1). The halves 48, 50 are produced, in particular, from plastic and are connected to one another in any way, e.g. by adhesive bonding or by means of mechanical fastening elements.

The housing 46 forms a substantially cylindrical region 60, within which the fan rotor 40 is arranged, and a first, lower outlet channel 62 having a first air outlet opening 56, which is directed at the lower screen 44, and a second, upper outlet channel 64 having a second air outlet opening 58, which is directed at the upper screen 44. The region 60 of the housing 46 comprises, on each of two side walls 66 (only one of which is visible in FIG. 2), respectively an air inlet opening 54, which defines a central axis 52. This axis 52 corresponds at least approximately to the axis of rotation of the fan rotor 40 arranged in the housing 46, i.e. these two axes can be coaxial, although it would also be conceivable to offset the axis of the fan rotor 40 relative to the axis 52 in the forward direction and/or vertical direction. In the axial direction, the fan rotor 40 is central in the housing 46.

In general, a number of housings 46 with respective fan rotors 40 arranged therein may be distributed over the width of the cleaning device 26 in a manner known per se. The fan rotors 40 respectively arranged in the housings 46 can be mounted on a single, common shaft, or shafts may be assigned to each, respectively, to one or more fan rotors, allowing their rotational speeds to be adjusted separately.

During operation, the fan rotor 40 rotates in the counterclockwise direction in the figures and sucks in air from the environment on both sides through the air inlet openings 54 by means of its blades (see FIG. 1) substantially in (with respect to the axis 52) the axial direction. This air is conveyed in the tangential direction by the fan rotor 40 and is discharged in the tangential direction through the air outlet openings 56, 58.

It can be appreciated that, during the assembling of the fan assembly 42, the fan rotor 40 is to be inserted into the housing 46 through the air inlet opening 54. Therefore, the diameter of the fan rotor 40 cannot be greater than the diameter of the air inlet openings 54. If the air inlet openings 54 thus are larger than the envelope circle diameter of the fan rotor 40, this would, however, have disadvantageous effects on the aerodynamic properties of the fan assembly 42, because an excessively large air inlet opening 54 would have the result that the air taken in is also discharged through the air inlet opening in the outer region of the air inlet opening 54. Accordingly, in order to allow the fan rotor 40 to be installed in the housing 46, while, however, keeping the air inlet openings 54 sufficiently small for aerodynamic reasons, an inlet ring 70 is fastened to the side walls 66, adjacently to the air inlet opening 54 in each case, said inlet ring 70 extending radially inward from the inner edge of the air inlet opening 54 in the side walls 66 of the housing 46. In particular, the inlet ring 70 forms a cone, i.e. it bends inward, toward the fan rotor 40. The inlet ring 70 is mounted only after the fan rotor 40 has been installed in the housing 46. In this way, the aerodynamics of the fan assembly 42 are improved in comparison with an arrangement without the inlet ring 70.

In the prior art, the inlet rings 70 are fastened to the housing 46 by means of screws, the screw threads of which are screwed into separate retainers, which in turn are fixed in a form- and/or force-fitting manner on the inner edge of the wall 66 of the housing, said inner edge being adjacent to the air inlet opening 54. This means a high outlay of individual parts and especially of mounting time.

Figure 3:
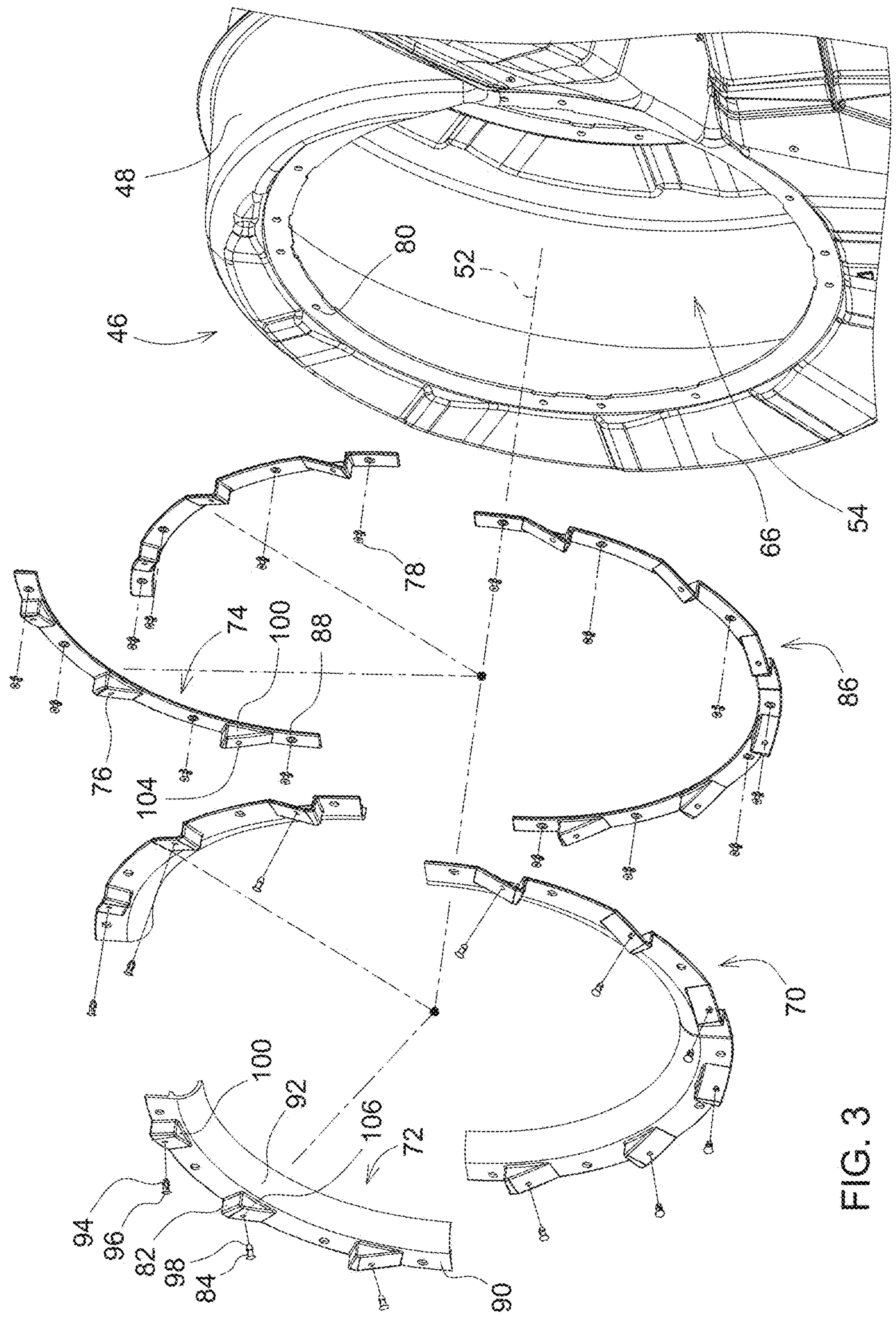
FIG. 3 is a schematic exploded perspective view of the housing shown in FIG. 2.

Reference is now made to FIG. 2 and in particular to FIG. 3, which shows a first embodiment of how the inlet ring 70 is fastened according to the disclosure. This fastening is accomplished by means of a retaining ring 86, which in turn is fastened to the housing 46. The retaining ring 86 is composed of a single segment or of at least two (four, in the embodiment shown) segments 74, which (apart from elevations 76) are flat in themselves and, in the mounted state, lie in the plane of the wall 66 and extend outward from the inner edge of the wall 66, said inner edge being adjacent to the air inlet opening 54, and collectively surround the inner edge of the wall 66, said inner edge being adjacent to the air inlet opening 54. The retaining ring 86 does not extend from the inner edge of the wall 66 into the air inlet opening 54, or at least not so far that said retaining ring would impede the installation of the fan rotor 44. The segments 74 of the retaining ring 86 are fastened to the wall 66 by means of rivets 78, which extend through openings 88 in the retaining ring 86 and openings 80 in the wall 66. Accordingly, the retaining ring 86 is permanently fastened to the wall 66. Instead of the rivets 78, any other fastening elements could also be used, such as features which engage in one another in a form-fitting manner (such as the spring pins 84, noted below). To simplify production, in particular fastening elements that can be quickly and easily attached are used.

The inlet ring 70 is likewise composed of at least two (four, in the embodiment shown) segments 72, which collectively surround the inner edge of the wall 66, said inner edge being adjacent to the air inlet opening 54. The segments 72 of the inlet ring 70 comprise radially outer regions 90, which, apart from elevations 82, are flat in themselves and overlap with the retaining ring 86, and radially inner regions 92, which (with respect to the axis 52) are curved inward conically in the radial direction and in the axial direction, as shown in FIG. 3, with a radius of curvature.

The elevations 76 of the retaining ring 86 and the elevations 82 of the inlet ring 70 are shaped to fit one another, so that the elevations 82 of the inlet ring 70 and the elevations of the retaining ring 86 respectively come to lie precisely on one another. The elevations 82 of the inlet ring 70 and the elevations of the retaining ring 86 are therefore complementarily shaped so that they fit together as precisely as possible. The inlet ring 70 is fixed on the retaining ring 86 by means of retaining elements in the form of spring pins 84, which extend through coaxial openings 104, 106 in the elevations 82 of the inlet ring 70 and in the elevations 76 of the retaining ring 86. The spring pins 84 comprise a shaft 94, which is composed of a plurality of elements extending in its longitudinal direction, and a head 96, which comes into contact with, respectively, an elevation 82 of the inlet ring 70 from the outside. The elements of the shaft 94 are preloaded outward transversely to its longitudinal direction and comprise terminal barbs 98, which abut the inner side (facing the wall 66) of the elevation 76 of the retaining ring 86. Consequently, during the mounting of the inlet ring 70 the spring pins 84 can be easily inserted into the openings and lock there automatically and permanently.

The elevations 76, 82 of the retaining ring 86 and of the inlet ring 70 are formed by regions of the retaining ring 86 and of the inlet ring 70 extending axially outward from the plane of the respective ring and have substantially the same material thickness as the rest of the retaining ring 86 or inlet ring 70. As a result, free spaces for receiving the heads of the spring pins 84 are provided on the inside of the elevations 76 of the retaining ring 86. Also, the segments 72, 74 can be produced by deep drawing or other forming processes.

In the first embodiment according to FIGS. 2 and 3, the elevations 76, 82 are triangular (namely sawtooth-shaped) in the circumferential direction, while they are flat in themselves in the radial direction. Also, the radially inner, axially extending walls 100 of the elevations are closed, inter alia for reasons of mechanical stability.

Figure 4:
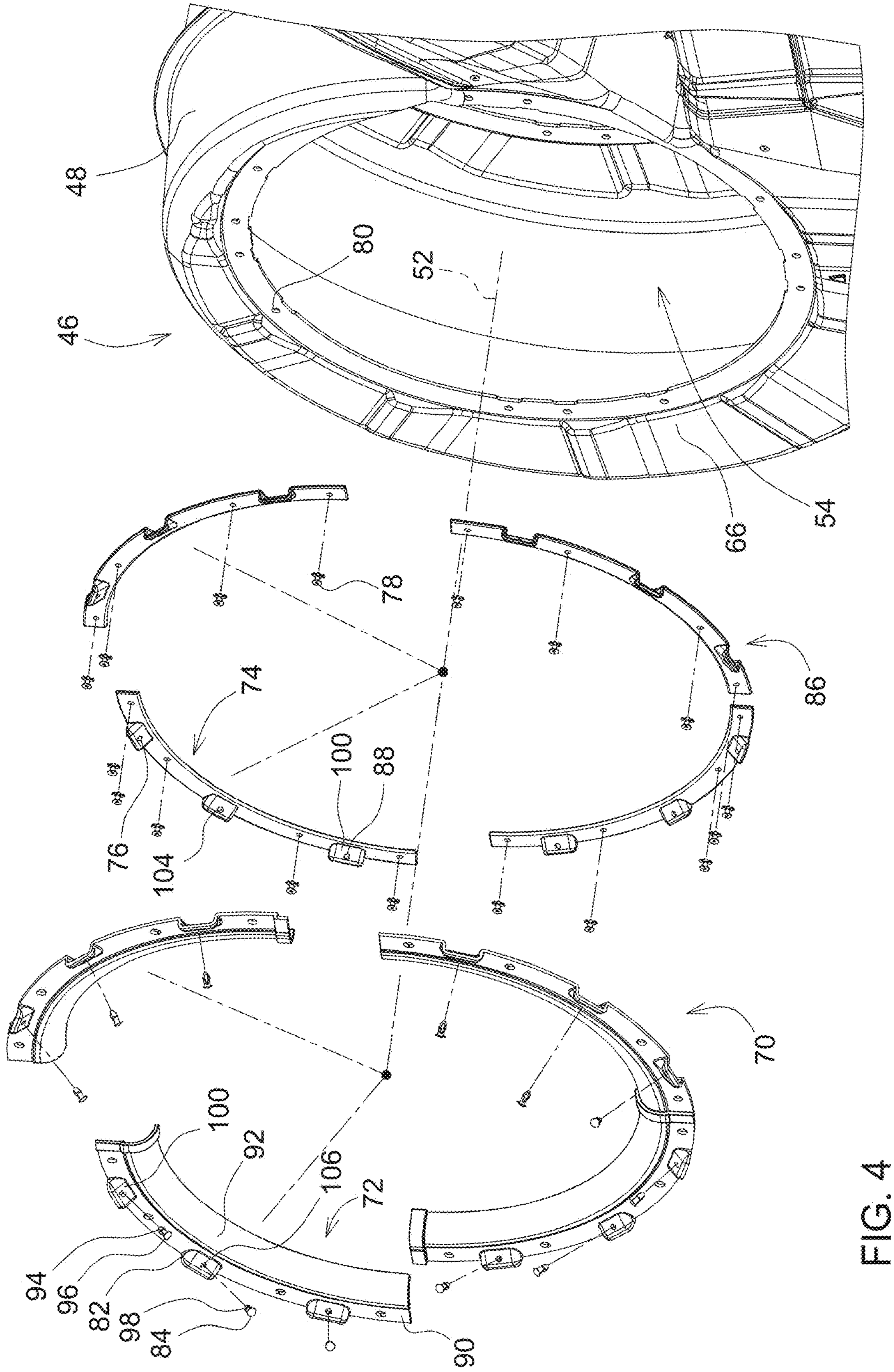
FIG. 4 is a schematic exploded perspective view of a second embodiment of the housing.

In the second embodiment according to FIG. 4, the elevations 76, 82 are triangular (namely sawtooth-shaped) and rise toward the outside in the radial direction, while they are flat in themselves in the circumferential direction. Also, the walls 100 that belong to the elevations and that lead and trail in the circumferential direction are closed, inter alia for reasons of mechanical stability.

It is also mentioned that the inner rim of the retaining ring 86 does not necessarily have to be arranged directly at the air inlet opening 54 in the radial direction, but rather the inner rim of said retaining ring could also be offset outward with respect to the air inlet opening 54. Likewise in such an embodiment, the retaining ring 86 extends radially inward with respect to (or relative to) the air inlet opening 54. Furthermore, the retaining ring 86 does not have to be gapless as shown in the drawings, but rather gaps could also remain between the segments 74. Since the retaining ring 86 is fastened to the housing 46 before the fan rotor 40 is mounted, said retaining ring could also be formed as a single piece. However, the multi-piece embodiment constructed from segments 74 is practical in the case of repair.

After all this, the time outlay for assembling the fan assembly 42 is simplified in comparison with the prior art, since only the rivets 78 and the spring pins 84 are to be mounted.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A fan assembly for a cleaning device of a combine harvester, the fan assembly comprising:

- a fan rotor, which can be set into rotation about an axis of rotation by a drive;
- a housing, which accommodates the fan rotor and which has an air inlet opening, through which the fan rotor is insertable into the housing, and at least one air outlet opening, which is tangential to the fan rotor;
- an inlet ring, which extends radially inward from the air inlet opening of the housing;
- a retaining ring fastened to the housing, wherein the retaining ring extends radially outward with respect to the air inlet opening and is equipped with elevations distributed around its circumference;
- wherein the inlet ring is attached to the face of the retaining ring spaced apart from the housing and is provided with elevations, which are complementary to the elevations of the retaining ring and abut the elevations of the retaining ring from the outside; and wherein the retaining ring and the inlet ring are connected to one another at the elevations by insertable retaining elements extending through coaxial openings in the elevations of the retaining ring and the elevations of the inlet ring.

2. The fan assembly as claimed in claim 1, wherein the retaining elements are in the form of spring pins.

3. The fan assembly as claimed in claim 1, wherein the retaining ring is constructed from a number of segments distributed around the circumference of the air inlet opening.

4. The fan assembly as claimed in claim 1, wherein the inlet ring is constructed from a number of segments distributed around the circumference of the air inlet opening.

5. The fan assembly as claimed in claim 1, wherein the retaining ring is fastened to the housing by a plurality of fastening elements.

6. The fan assembly as claimed in claim 5, wherein the plurality of fastening elements include rivets.

7. The fan assembly as claimed in claim 1, wherein the retaining ring does not extend beyond the outside diameter of the fan rotor.

8. The fan assembly as claimed in claim 1, wherein the elevations of the retaining ring and of the inlet ring are formed by regions of the retaining ring and of the inlet ring extending axially outward from the plane of the respective ring and have substantially the same material thickness as the rest of the retaining ring and inlet ring.

9. The fan assembly as claimed in claim 1, wherein the elevations have one of a triangular shape or a rectangular shape in one of a circumferential direction or a radial direction.

10. A fan assembly for a cleaning device of a combine harvester, the fan assembly comprising:

a fan rotor, which can be set into rotation about an axis of rotation by a drive;

a housing, which accommodates the fan rotor and which has an air inlet opening, through which the fan rotor is insertable into the housing, and at least one air outlet opening, which is tangential to the fan rotor;

an inlet ring, which extends radially inward from the air inlet opening of the housing;

a retaining ring fastened to the housing, wherein the retaining ring extends radially outward with respect to the air inlet opening and is equipped with elevations distributed around its circumference;

wherein the inlet ring is attached to the face of the retaining ring spaced apart from the housing and is provided with elevations, which are complementary to the elevations of the retaining ring and abut the elevations of the retaining ring from the outside;

wherein the retaining ring and the inlet ring are connected to one another at the elevations by insertable retaining elements extending through coaxial openings in the elevations of the retaining ring and the elevations of the inlet ring; and wherein the retaining ring does not extend inward over the edge of the air inlet opening of the housing.

11. A combine harvester comprising:

a chassis rotatably supporting a plurality of wheels;

a feeder house assembly configured for receiving crop from a harvesting header;

a thresher configured for receiving the crop from the feeder house;

a cleaning device configured for receiving the crop from the thresher, the cleaning device including an upper screen, a lower screen, and a fan assembly configured for moving air across the upper screen and the lower screen, wherein the fan assembly includes:

a fan rotor, which can be set into rotation about an axis of rotation by a drive;

a housing, which accommodates the fan rotor and which has an air inlet opening, through which the fan rotor is insertable into the housing, and at least one air outlet opening, which is tangential to the fan rotor;

an inlet ring, which extends radially inward from the air inlet opening of the housing;

a retaining ring fastened to the housing, wherein the retaining ring extends radially outward with respect to the air inlet opening and is equipped with elevations distributed around its circumference;

wherein the inlet ring is attached to the face of the retaining ring spaced apart from the housing and is provided with elevations, which are complementary to the elevations of the retaining ring and abut the elevations of the retaining ring from the outside; and wherein the retaining ring and the inlet ring are connected to one another at the elevations by insertable retaining elements extending through coaxial openings in the elevations of the retaining ring and the elevations of the inlet ring.

12. The combine harvester as claimed in claim 11, wherein the retaining elements are in the form of spring pins.

13. The combine harvester as claimed in claim 11, wherein the retaining ring is constructed from a number of segments distributed around the circumference of the air inlet opening.

14. The combine harvester as claimed in claim 11, wherein the inlet ring is constructed from a number of segments distributed around the circumference of the air inlet opening.

15. The combine harvester as claimed in claim 11, wherein the retaining ring is fastened to the housing by a plurality of fastening elements.

16. The combine harvester as claimed in claim 15, wherein the plurality of fastening elements include rivets.

17. The combine harvester as claimed in claim 11, wherein the retaining ring does not extend inward over the edge of the air inlet opening of the housing.

18. The combine harvester as claimed in claim 11, wherein the retaining ring does not extend beyond the outside diameter of the fan rotor.

19. The combine harvester as claimed in claim 11, wherein the elevations of the retaining ring and of the inlet ring are formed by regions of the retaining ring and of the inlet ring extending axially outward from the plane of the respective ring and have substantially the same material thickness as the rest of the retaining ring and inlet ring.

20. The combine harvester as claimed in claim 11, wherein the elevations have one of a triangular shape or a rectangular shape in one of a circumferential direction or a radial direction.

* * * * *